United States Patent
Yan et al.

(10) Patent No.: US 7,624,906 B2
(45) Date of Patent: Dec. 1, 2009

(54) ULTRASONIC BRAZING OF ALUMINUM ALLOY AND ALUMINUM MATRIX COMPOSITE

(75) Inventors: Jiuchun Yan, Nangang District Harbin (CN); Weiwei Zhao, Nangang District Harbin (CN); Huibin Xu, Nangang District Harbin (CN); Dacheng Li, Nangang District Harbin (CN); Zhiwu Xu, Nangang District Harbin (CN); Shiqin Yang, Nangang District Harbin (CN); Yang Zhang, Nangang District Harbin (CN); Zhipeng Ma, Nangang District Harbin (CN)

(73) Assignee: Harbin Institute of Technology, Nangang District, Harbin (CN)

( * ) Notice: Subject to any disclaimer, the term of this patent is extended or adjusted under 35 U.S.C. 154(b) by 30 days.

(21) Appl. No.: 11/986,612

(22) Filed: Nov. 21, 2007

(65) Prior Publication Data

US 2009/0020589 A1    Jan. 22, 2009

(30) Foreign Application Priority Data

Jul. 20, 2007  (CN) .................. 2007 1 0072535
Jul. 20, 2007  (CN) .................. 2007 1 0072536

(51) Int. Cl.
*B23K 1/06*        (2006.01)
(52) U.S. Cl. ................. 228/111.5; 228/110.1; 228/245; 228/246; 228/262.5; 228/262.51
(58) Field of Classification Search .............. 228/110.1, 228/111.5, 245, 246, 249, 251, 262.5, 262.51; 420/516, 532
See application file for complete search history.

(56) References Cited

U.S. PATENT DOCUMENTS

| 5,322,205 | A | * | 6/1994 | Kato et al. | ............... 228/110.1 |
| 5,504,296 | A | * | 4/1996 | Sato et al. | ................... 219/85.1 |
| 5,992,729 | A | * | 11/1999 | Koopman et al. | ........... 228/175 |
| 6,010,059 | A | * | 1/2000 | Newland | .................. 228/110.1 |
| 6,840,431 | B1 | * | 1/2005 | Kim | ........................... 228/203 |

FOREIGN PATENT DOCUMENTS

WO    WO 2005061743 A1 *  7/2005

* cited by examiner

*Primary Examiner*—Jessica L Ward
*Assistant Examiner*—Kevin E Yoon
(74) *Attorney, Agent, or Firm*—Raymond Y. Chan; David and Raymond Patent Firm

(57) ABSTRACT

A method of ultrasonic brazing metal matrix composite, which forms a reinforced composite bond without filling welding wire with reinforcement or adding alloy element to generate ceramic phase, includes the steps of setting a filler metal; introducing ultrasonic vibration to braze in air; dissolving the base materials, and introducing ultrasonic wave again. The method performs the aluminum brazing at low temperature. The periodic time of brazing is shorter and the cost is lower than the conventional brazing methods. The strength, service temperature and dimensional stability of the joint are close to the base article.

18 Claims, 2 Drawing Sheets

ULTRASONIC BRAZING OF ALUMINUM ALLOY AND ALUMINUM MATRIX COMPOSITE

BACKGROUND OF THE PRESENT INVENTION

1. Field of Invention

The present invention relates to a method of brazing, and more particular to a method of ultrasonic brazing an aluminum alloy or aluminum matrix composite article with a base article.

2. Description of Related Arts

Aluminum and its alloy have the psychical properties of low-density, high strength and corrosion, and have a lower price compared to copper. The aluminum matrix composites also have the advantages of high strength, high modulus, heat resistance, corrosion resistance, abrasion resistance, good thermal conductivity of electrical conductivity, and small thermal expansion coefficient. Therefore, aluminum alloy and aluminum matrix composites are vital to the industries of aviation, aerospace, shipbuilding, automobiles, high-speed trains, and other fields. Generally, aluminum alloy and aluminum matrix composites are connected by brazing.

Traditionally, aluminum alloy is brazed in a vacuum environment. Accordingly, the brazing equipments are expensive and the working period thereof is relatively long. In addition, aluminum alloy cannot be brazed with complex constructions. In air, brazing of aluminum alloy needs fluxes to remove oxidized film, and help the liquid solder to wet the base material, which will unavoidably corrode the base material. Also, the melting point of the solder for traditional welding is high, and the brazing temperature is higher than 600° C. which is close to the critical point of the solid phase of the base material. Therefore, the brazing temperature needs to be accurately controlled within a narrowly temperature range such that the cost and time of the brazing operation will be significantly increased.

A filler metal for using in the welding operation is either a welding wire with particle filler or an alloy added filler metal, wherein the filler metal is reacted to generate a ceramic phase like reinforcement to reinforce the bond of the aluminum matrix composite. For example, the patents, U.S. Pat. No. 4,625,095 and U.S. Pat. No. 4,752,537, owned by Boeing Company provide a method that forms a fiber reinforced weld in a fiber reinforced metal matrix composite by both fibrous reinforcing material and powdered matrix metal or coating along the weld line prior to form the pool with mixture of adhesive, powdered matrix metal, and fibrous reinforcing material. U.S. Pat. No. 4,803,334, owned by Westinghouse Electric Corporation, provides a method that a substantially homogeneous metal matrix composite weld is formed by a laser beam welding while feeding a metal matrix composite filler wire into the weld pool. U.S. Pat. No. 4,738,389, owned by Moshier WC, teaches a method for welding metal composite materials, including metal-ceramic composites, whereby a weld or filler material is prepared by the in-situ precipitation of ceramic in a metallic matrix. The filler material may comprise boride, carbide, oxide, nitride, silicide, etc, while the matrix metal may constitute an alloy or intermetallic of two or more metals. China Pat No. CN1895830 from Jiang Su University teaches a method for plasma arc welding particle reinforced aluminum matrix composites by the in-situ precipitation of ceramic particle in weld. In the process, Ti, Zr, B, Si are added, wherein using the welding pool generated by the plasma arc welding, those elements are reacted with aluminum, nitrogen or reinforcement particles to form reinforcement, to prohibit harmful phase, and to realize the in-situ precipitation of the particles reinforced aluminum matrix composites welded joints. The research of University of Science and Technology Beijing teaches the mixture of Al powder, Si powder, SiC particles, or mixture of Al powder, Si powder, W particles as filling material to perform transient liquid phase diffusion bonding (Huang et al, Nonferrous Met. Soc. China. 2005, 15, 1067-1071). Harbin Institute of Technology discloses a method and a system for producing composite solder for particle reinforcement aluminum matrix composites brazing, and realized reinforced composite weld [China Pat No. CN1827809].

SUMMARY OF THE PRESENT INVENTION

Different from the prior arts mentioned above, the present invention that brazing an aluminum matrix composite does not need to fill welding wire with reinforcement, or add alloy elements to generate ceramic phase, but can form reinforced composite bond. This invention can also be used in aluminum alloy brazing. It solved the problems of traditional aluminum alloy brazing operation, such as expensive equipments, high cost, long working, period, hard to connect complex constructions, and the problems of soldering such as cannot obtain ideal joints. It also solves the problem that using flux in air brazing or soldering of aluminum alloy or aluminum matrix composite corrodes the base material.

In order to accomplish the above objects, the present invention provides a method of ultrasonic brazing aluminum alloy or aluminum matrix composite article to a base article, comprising the steps of:

(a) positioning a filler metal at a position between the two articles, wherein the position therebetween can be the clearance between surfaces of the two articles or the opening edge of the clearance between the two articles;

(b) initially ultrasonic brazing the articles via an ultrasonic horn to form a joint at the position thereof;

(c) selectively adjusting the temperature at the joint; and (d) applying pressure and ultrasonic at the joint.

Accordingly, the metal matrix composite article and the base article are Aluminum alloy or Aluminum matrix composite.

In the step (a), the filler metal is Al—Zn—Cu—Mg—Ag—Si—Ni—La alloy, wherein the Al—Zn—Cu—Mg—Ag—Si—Ni—La alloy contains (by weight) 5%~55% of Al, 42%~91% of Zn, 2%~3% of Cu, 0.03%~0.4% of Mg, 0.2%~1.5% of Ag, 0.1%~1.0% of Si, 0.08%~0.3% of Ni, and 0.01%~0.1% of La.

The present invention is used to braze aluminum alloy and aluminum matrix composites. This method can perform ultrasonic brazing under low temperature and air pressure without using flux in air. The joint has high strength and good quality and can also perform under high temperature. During aluminum matrix composites brazing, the reinforced composite bond can be obtained without filling filler metal with particles or adding alloy element for generating ceramic phase.

In the step (c), the matrix around the bond can be dissolved by the liquid filler metal to liquid state or semi-solid-liquid state. During aluminum alloy brazing, in the step (d), the base material alloy and the filler metal are mixed to form new alloy bond with the action of ultrasonic. During aluminum matrix composite brazing, in the step (d), with the action of ultrasonic, the reinforcement, liquid base material alloy, and filler metal are mixed to form a new composite bond, and a reinforced composite construction at the bond area is generated. Using this method of the present invention, the alloy composition of the joint is changed, the working temperature and performance is largely improved.

Using the above method of the present invention for aluminum matrix composites brazing, the physical properties and thermal expansion of the joint are very close to the base article. Because no flux is used, there is no corrosion and pollution after brazing. Since this method brazes the aluminum alloy and aluminum matrix composites under normal atmospheric pressure without using flux, the deformation of the joint is relatively small. In addition, the method of the present invention can be performed within a relatively large temperature controlling range in comparison with the conventional brazing method. It is easy to operate and requires less investment on equipment. The method can be easily operated for automatic brazing. It also reduces the power consuming. Compared with the traditional brazing methods, this method reduces the brazing period of 30%~60%, reduces the cost of 20%~45%, the strength of the joint, the working temperature and dimensional stability are close to the base article.

These and other objectives, features, and advantages of the present invention will become apparent from the following detailed description, the accompanying drawings, and the appended claims.

DETAILED DESCRIPTION OF THE PREFERRED EMBODIMENT

Figure 1:
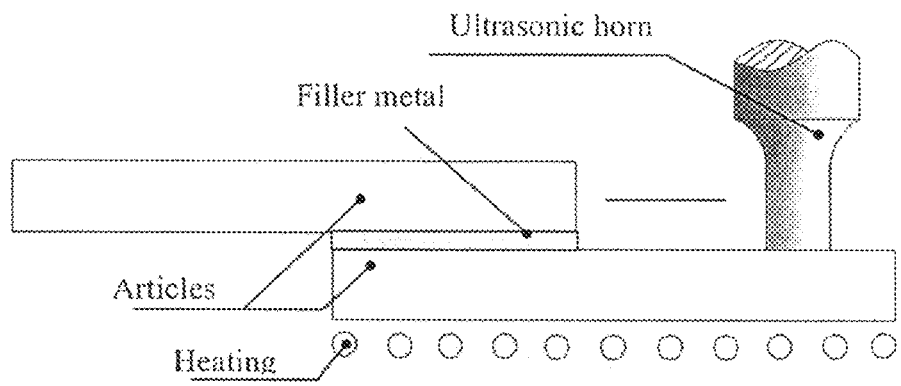
FIG. 1 is a schematic view of a brazing system according to the 19th embodiment of the present invention.

The first embodiment: in the first embodiment of the present invention, the method of ultrasonic brazing metal matrix composite article to a base article comprises the steps of:

(a) positioning a filler metal at a position between the two articles, wherein the position therebetween can be the clearance between surfaces of the two articles or the opening edge of the clearance between the two articles;

(b) initially ultrasonic brazing the articles to form a joint at the position thereof;

(c) selectively adjusting the temperature at the joint; and (d) applying pressure and ultrasonic at the joint.

According, the operation requires a two-step ultrasonic brazing process in the step (b) and the step (d). In other words, the method of the present invention contains two individual steps of introducing ultrasonic vibration to braze in air in the step (b) and introducing ultrasonic wave again in the step (d). In the step (a), the filler metal is Al—Zn—Cu—Mg—Ag—Si—Ni—La alloy filled at the clearance of the two articles, wherein the Al—Zn—Cu—Mg—Ag—Si—Ni—La alloy contains (by weight) 5%~55% of Al, 42%~91% of Zn, 2%~3% of Cu, 0.03%~0.4% of Mg, 0.2%~1.5% of Ag, 0.1%~1.0% of Si, 0.08%~0.3% of Ni, and 0.01%~0.1% of La. The metal matrix composite article can be aluminum alloy, or aluminum matrix composites.

The second embodiment: the difference between the first and second embodiments is that, in the step (a), the filler metal is prepared as a thin slice with the thickness of 50~500 µm, or as a wire or a rod with the diameter of 1000~5000 µm. The other steps and parameters are the same as the first embodiment.

The third embodiment: the difference between the first and third embodiments is that, in the step (b), the frequency of the ultrasonic used in the brazing is 20~100 kHz and the amplitude is 1~50 µm. The other steps and parameters are the same as the first embodiment.

The fourth embodiment: the difference between the first and fourth embodiments is that, in the step (b), the brazing temperature of ultrasonic brazing is about 380~450° C. The other steps and parameters are the same as the first embodiment.

The fifth embodiment: the difference between the first and fifth embodiments is that, in the step (b), the time of ultrasonic brazing is about 0.1~60 s. The other steps and parameters are the same as the first embodiment.

The sixth embodiment: the difference between the first and sixth embodiments is that, in the step (c), the adjusted temperature of the joint is about 450~550° C. The other steps and parameters are the same as the first embodiment.

The seventh embodiment: the difference between the first and seventh embodiment is that, in the step (c), the adjusted temperature of the joint is 450-550° C. and the adjusted temperature is maintained in 1~60 min. The other steps and parameters are the same as the first embodiment.

The eighth embodiment: the difference between the first and eighth embodiments is that, in the step (d), the frequency of the ultrasonic used in the brazing is 20~100 kHz and the amplitude is 1~50 µm. The other steps and parameters are the same as the first embodiment.

The ninth embodiment: the difference between the first and ninth embodiments is that, in the step (d), the time of the ultrasonic brazing is about 0.1~60 s. The other steps and parameters are the same as the first embodiment.

The tenth embodiment: the difference between the first and tenth embodiments is that, in the step (d), the pressure applied on the joint is about 0.1~2 MPa. The other steps and parameters are the same as the first embodiment.

The eleventh embodiment: the difference between the first and eleventh embodiments is that the step (d) is repeated from 1~5 times. The other steps and parameters are the same as the first embodiment.

The twelfth embodiment: the difference between the first and twelfth embodiments is that, in the step (a), the Filler metal is prepared as a thin slice with the thickness of 100~400 µm, or as a wire or a rod with the diameter of 2000~4500 µm. The other steps and parameters are the same is the first embodiment.

The thirteenth embodiment: the difference between the first and thirteenth embodiments is that, in the step (a), the filler metal is prepared as a thin slice with the thickness of 300 µm, or as a wire or a rod with the diameter of 3000 µm. The other steps and parameters are the same as the first embodiment.

The fourteenth embodiment: the difference between the first and fourteenth embodiments is that, in the step (b), the frequency of the ultrasonic used in the brazing is about 20~70 kHz, the amplitude is about 5~40 µm, the temperature of the brazing is about 400~440° C. The other steps and parameters are the same as the first embodiment.

The fifteenth embodiment: the difference between the first and fifteenth embodiments is that, in the step (b), the frequency of the ultrasonic used in the brazing is 20 kHz, the amplitude is 20 μm, the temperature of the brazing is 420° C. The other steps and parameters are the same as the first embodiment.

The sixteenth embodiment: the difference between the first and sixteenth embodiment is that, in the step (d), the frequency of the ultrasonic used in the brazing is about 20~70 kHz, the amplitude is about 5~40 μm, the ultrasonic brazing time is about 10~55 s. The other steps and parameters are the same as the first embodiment.

The seventeenth embodiment: the difference between the first and seventeenth embodiment is that, in the step (d), the frequency of the ultrasonic used in the brazing is 20 kHz, the amplitude is 20 μm, the ultrasonic brazing time is 30 s. The other steps and parameters are the same as the first embodiment.

The eighteenth embodiment: the difference between the first and eighteenth embodiment is that, in the step (c), the adjusted temperature of the joint is 480~520° C., and the adjusted temperature is maintained in 5~30 min. The other steps and parameters are the same as the first embodiment.

The nineteenth embodiment: referring to FIG. 1, the method of ultrasonic brazing aluminum matrix composite article to a base article comprises the steps of:
  (a) positioning a thin slice of Al—Zn—Cu—Mg—Ag—Si—Ni—La alloy filler metal, 100 μm in thickness, at a position between the two articles, wherein the position therebetween is the clearance between Surfaces of the two articles;
  (b) initially ultrasonic brazing the articles to form a joint at the position thereof, wherein the frequency of the ultrasonic is 20 kHz, the amplitude is 20 μm, the brazing temperature is 420° C.;
  (c) selectively adjusting the temperature at the joint at 500° C., and maintaining lo the brazing temperature for 20 minutes;
  (d) applying pressure and ultrasonic at the joint final brazing, wherein the frequency of the ultrasonic is 20 kHz, the amplitude is 20 μm, the brazing time is 30 s, and the pressure is 1 MPa.

In this embodiment, the melting point of the Al—Zn—Cu—Mg—Ag—Si—Ni—La alloy filler metal is relatively low, so the brazing temperature can be lowered. The composition of the bond has substantial changes. The content of the Zn element is largely reduced while the content of the Al element is largely increased. The melting point of the bond is increased while the high quality joint can be obtained at low working temperature. At the same time, the mechanical properties and thermal expansion properties of the joint are greatly improved, and the thermal expansion coefficient thereof is relatively low. The strength of the bond between the articles is even close to the base material.

In the step (d) of the embodiment, the solder in the clearance remains in liquid or semi-liquid-solid state.

Figure 2:
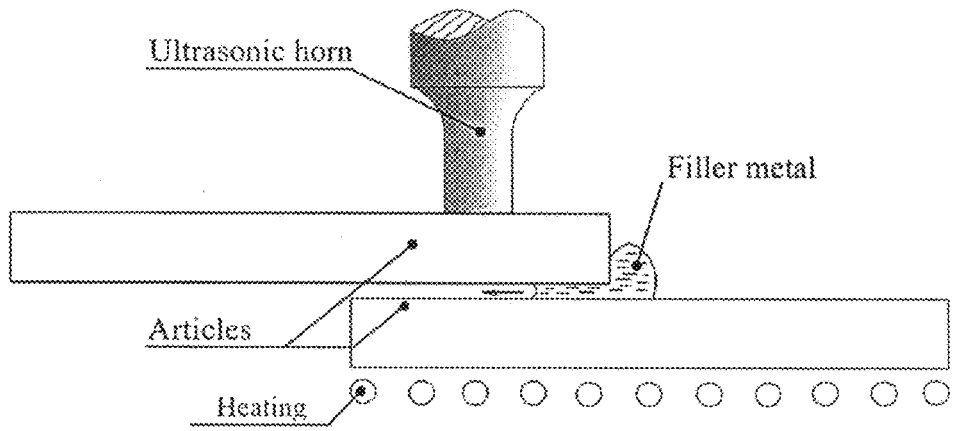
FIG. 2 is a schematic view of a brazing system according to the 20th embodiment of the present invention.

The twentieth embodiment: referring to FIG. 2, the method of ultrasonic brazing aluminum alloy article to a base article comprises the steps of:
  (a) positioning a wire of Al—Zn—Cu—Mg—Ag—Si—Ni—La alloy filler metal, having a size of 3000 μm in diameter, at a position between the two articles, wherein the position therebetween is the opening edge of the clearance between the two articles;
  (b) initially ultrasonic brazing the articles to form a joint at the brazing position thereof, wherein the frequency of the ultrasonic is 30 kHz, the amplitude is 25 μm, and the brazing temperature is 440° C.;
  (c) selectively adjusting the temperature at the joint at 510° C., and maintaining, the temperature for 20 minutes;
  (d) applying pressure and ultrasonic at the joint for ultrasonic brazing, wherein the frequency of the ultrasonic is 30 kHz, the amplitude is 20 μm, the brazing time is 25 s, and the pressure is 1 MPa.

Figure 3:
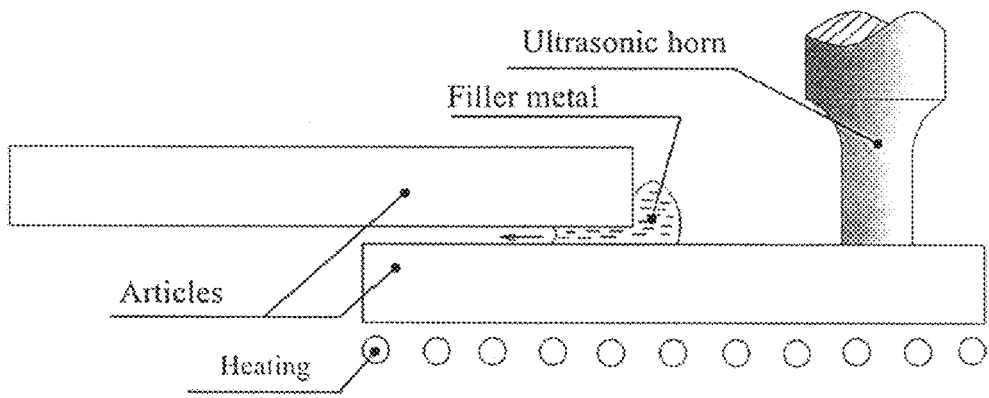
FIG. 3 is a schematic view of a brazing system according to the 21st embodiment of the present invention.

The twenty-first embodiment: referring to FIG. 3, the method of ultrasonic brazing aluminum matrix composite article to a base article comprises the steps of:
  (a) positioning a rod of Al—Zn—Cu—Mg—Ag—Si—Ni—La alloy filler metal, having a size of 5000 μm in diameter, at a position between the two articles, wherein the position therebetween is the opening edge of the clearance between the two articles;
  (b) initially ultrasonic brazing the articles to form a joint at the brazing position thereof, wherein the frequency of the ultrasonic is 20 kHz, the amplitude is 20 μm, and the brazing temperature is 420° C.;
  (c) selectively adjusting the temperature at the joint at 500° C., and maintaining the brazing temperature for 5 minutes;
  (d) applying pressure and ultrasonic at the joint for ultrasonic brazing, the frequency of the ultrasonic is 20 kHz, the amplitude is 20 cm, the brazing time is 5 s, and the pressure is 1 MPa.

In the step (d) of the embodiment, the filler metal in the clearance remains in liquid or semi-liquid-solid state.

Figure 5:
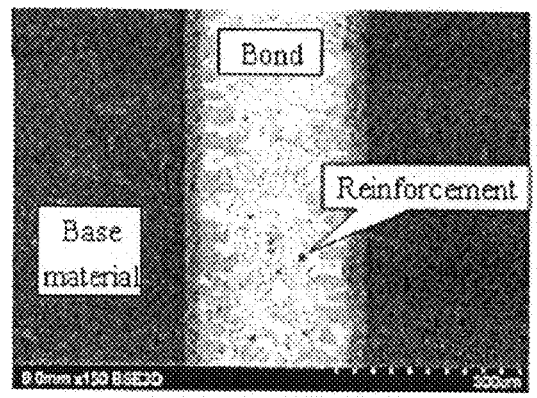
FIG. 5 is the scanning electronics micrographic of the joint of the traditional aluminum matrix composites brazing.
Figure 6:
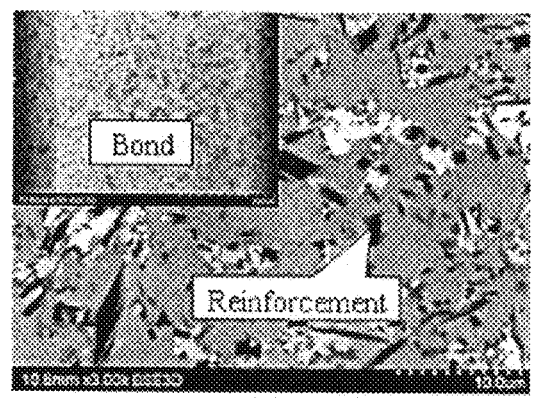
FIG. 6 is the scanning electronics micrographic of the joint of the 21st embodiment of the present invention.

FIG. 5 illustrates the scanning electronics micrographic of the traditional aluminum matrix composites joints. FIG. 6 illustrates the scanning electronics micrographic of the aluminum matrix composites joints using this embodiment of the present invention.

Figure 4:
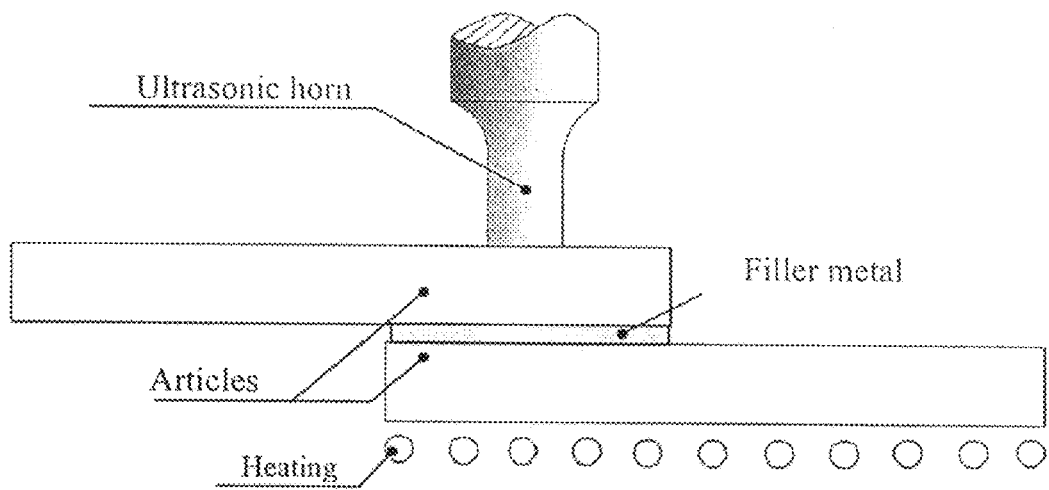
FIG. 4 is a schematic view of a brazing system according to the 22nd embodiment of the present invention.

The twenty-second embodiment: referring to FIG. 4, the method of ultrasonic brazing aluminum alloy article to a base article comprises the steps of:
  (a) positioning;, a thin slice of Al—Zn—Cu—Mg—Ag—Si—Ni—La alloy filler metal, having a size of 400 μm in thickness, at a position between the two articles, wherein the position therebetween is the clearance between surfaces of the two articles;
  (b) initially ultrasonic brazing the articles to form a joint at the brazing position thereof, wherein the frequency of the ultrasonic is 70 kHz, the amplitude is 20 μm, and the brazing temperature is 420° C.;
  (c) selectively adjusting the temperature at the joint at 500° C., and maintaining the brazing temperature for 20 minutes;
  (d) applying pressure and ultrasonic at the joint for ultrasonic brazing, wherein the frequency of the ultrasonic is 70 kHz, the amplitude is 20 μm, the brazing time is 10 s, and the pressure is 1 MPa.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method of brazing a metal matrix composite article to a base article, comprising the steps of:
  (a) positioning, a filler metal at a brazing position between said two articles, wherein said filler metal is Al—Zn—Cu—Mg—Ag—Si—Ni—La alloy;
  (b) initially ultrasonic brazing said articles to fort a joint at said brazing position thereof;

(c) selectively adjusting a temperature at said joint; and
(d) applying pressure and ultrasonic at said joint to bond said articles together.

2. The method, as recited in claim 1, wherein said filler metal contains (by weight) 5%~55% Al, 42%~91% Zn, 2%~3% Cu, 0.03~0.4% Mg, 0.2%~1.5% Ag, 0.1%~1.0% Si, 0.08%~0.3% Ni, and 0.01%~0.1% La.

3. A method of brazing a metal matrix composite article to a base article, comprising the steps of:
   (a) positioning, a filler metal at a brazing position between said two articles, wherein said filler metal is Al—Zn—Cu—Mg—Ag—Si—Ni—La alloy;
   (b) initially ultrasonic brazing said articles to fort a joint at said brazing position thereof, wherein at least one of said articles is made of material selected from the group consisting of Aluminum alloy and Aluminum matrix composite;
   (c) selectively adjusting a temperature at said joint; and
   (d) applying pressure and ultrasonic at said joint to bond said articles together.

4. The method, as recited in claim 3, wherein said filler metal contains (by weight) 5%~55% of Al, 42%~91% of Zn, 2%~3% of Cu, 0.03%~0.4% of Mg, 0.2%~1.5% of Ag, 0.1%~1.0% of Si, 0.08%~0.3% of Ni, and 0.01%~0.1% of La.

5. The method, as recited in claim 4, wherein said filler metal is formed a thin slice with a thickness of 50~500 μm.

6. The method, as recited in claim 4, wherein said filler metal is formed a wire with a diameter of 1000~5000 μm.

7. The method as recited in claim 3 wherein, in the step (b), said ultrasonic has a frequency of 20~100 kHz and an amplitude of 1~50 μm.

8. The method as recited in claim 3 wherein, in the step (b), a temperature of said brazing is 380~450° C.

9. The method as recited in claim 3 wherein, in the step (b), a time of said brazing is 0.1~60 seconds.

10. The method as recited in claim 3 wherein, in the step (c), a temperature of said joint is adjusted at 450~550° C. and is maintained for 1~60 minutes.

11. The method as recited in claim 3 wherein, in the step (d), said ultrasonic has a frequency of 20~100 kHz and an amplitude of 1~50 μm.

12. The method as recited in claim 3 wherein, in the step (d), a time of said brazing is 0.1~60 seconds.

13. The method as recited in claim 3 wherein, in the step (d), said pressure applied to said joint is 0.1~2 MPa.

14. The method, as recited in claim 3, wherein the step (d) is repeated by 1~5 times.

15. The method as recited in claim 3 wherein, in the step (b), said ultrasonic has a frequency of 20 kHz, an amplitude of 20 μm, and a temperature of said brazing is 420° C.

16. The method as recited in claim 3 wherein, in the step (d), said ultrasonic has a frequency of 20 kHz, an amplitude of 20 μm, and an ultrasonic brazing time is 30 s.

17. The method as recited in claim 3 wherein, in the step (a), said filler metal is filled at said position which is a clearance between Surfaces of said two articles.

18. The method is recited in claim 3 wherein, in the step (a), said filler metal is filled at said position which is an opening edge of a clearance between said two articles.

* * * * *